US009481275B2

(12) United States Patent
Bohlke et al.

(10) Patent No.: US 9,481,275 B2
(45) Date of Patent: Nov. 1, 2016

(54) ARMREST DEVICE FOR A VEHICLE INTERIOR

(71) Applicants: Hartmut Bohlke, Wuppertal (DE); Juergen Salewski, Duesseldorf (DE); Wolfgang Sitzler, Wuppertal (DE); Wolfram Zummack, Troisdorf (DE); Bogdan Tutelea, Leichlingen (DE); Andreas Goebbels, Kuerten (DE)

(72) Inventors: Hartmut Bohlke, Wuppertal (DE); Juergen Salewski, Duesseldorf (DE); Wolfgang Sitzler, Wuppertal (DE); Wolfram Zummack, Troisdorf (DE); Bogdan Tutelea, Leichlingen (DE); Andreas Goebbels, Kuerten (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/718,413

(22) Filed: May 21, 2015

(65) Prior Publication Data

US 2015/0343925 A1 Dec. 3, 2015

(30) Foreign Application Priority Data

May 27, 2014 (DE) ........................ 10 2014 210 134

(51) Int. Cl.
*B60N 2/46* (2006.01)

(52) U.S. Cl.
CPC ........... *B60N 2/4606* (2013.01); *B60N 2/4633* (2013.01)

(58) Field of Classification Search
CPC .... B60N 2/46; B60N 2/4606; B60N 2/4613; B60N 2/462; B60N 2/4626; B60N 2/4633; B60N 2/4686; A47C 7/54; A47C 7/543
See application file for complete search history.

(56) References Cited

U.S. PATENT DOCUMENTS

| | | | | |
|---|---|---|---|---|
| 6,050,645 A * | 4/2000 | Bradbury | B60N 2/4633 | 297/411.32 |
| 6,635,813 B2 * | 10/2003 | Campling | G10D 3/043 | 84/318 |
| 7,080,719 B2 * | 7/2006 | Arnold | B66D 1/14 | 188/77 W |
| 7,108,318 B2 * | 9/2006 | Himmelhuber | B60N 2/4606 | 297/115 |
| 2009/0079228 A1 * | 3/2009 | Sturt | B60N 2/464 | 296/153 |
| 2012/0261970 A1 * | 10/2012 | Girbinger | B60N 2/4633 | 297/411.38 |

FOREIGN PATENT DOCUMENTS

| | | |
|---|---|---|
| DE | 10 2006 055 176 A1 | 5/2008 |
| DE | 10 2007 004 600 A1 | 7/2008 |

OTHER PUBLICATIONS

Office Action of German Patent Office issued in Application No. 10 2014 210 134.4 dated May 8, 2015 (7 pages).

* cited by examiner

*Primary Examiner* — Philip Gabler
(74) *Attorney, Agent, or Firm* — Flynn, Thiel, Boutell & Tanis, P.C.

(57) ABSTRACT

Armrest device having an armrest part swivellably movable between an armrest position and a not-in-use position, having a base part arranged fixed in the vehicle and on which the armrest part is mounted swivellably movable about a swivel axis, and having a locking device for supporting the armrest part in at least one swivel position relative to the base part. The swivel axis is axially split into a base axis section and an armrest axis section, and the locking device includes a wrap spring brake which interacts with the base axis section and the armrest axis section in order to release the armrest part during a swivel movement in the direction of the not-in-use position and to lock it during a reverse swivel movement.

21 Claims, 5 Drawing Sheets

1
2
4
3

1
4
2
3

4
7
5
7a
7b
6
S
S
12
10
8
3

5
6
5
12
8
11
4
3

ARMREST DEVICE FOR A VEHICLE INTERIOR

CROSS-REFERENCE TO RELATED APPLICATIONS

This application claims the priority of the German patent application DE 10 2014 210 134.4, the disclosure of which is hereby incorporated into this application.

FIELD OF THE INVENTION

The invention relates to an armrest device for a vehicle interior having an armrest part swivellably movable between an armrest position and a not-in-use position, having a base part arranged fixed in the vehicle and on which the armrest part is mounted swivellably movable about a swivel axis, and having a locking device for supporting the armrest part in at least one swivel position relative to the base part.

An armrest device of this type is preferably provided for a vehicle interior of a passenger car. The armrest device can be provided either in an extension of a centre console between the driving seat and the passenger seat or in the region of a rear bench seat as an armrest swivelling out of a backrest.

An armrest device of this type is generally known in passenger cars. The armrest device has an armrest part which is mounted swivellably between a not-in-use position swivelled upwards between driving seat and passenger seat, and an armrest position protruding forwards between driving seat and passenger seat. A swivel mounting for the armrest part is provided on a base part arranged fixed in the vehicle in the vehicle interior. To secure the armrest part in its end positions and in various intermediate positions, the armrest part is assigned a locking device that locks the armrest part relative to the base part or releases it for a swivel movement.

OBJECTS AND SUMMARY OF THE INVENTION

The object of the invention is to provide an armrest device of the type mentioned at the outset that permits a simple and space-saving design of a locking device and also a low-noise movement of the armrest part.

This object is achieved in that the swivel axis is axially split into a base axis section which is arranged stationary relative to the base part and an armrest axis section which is arranged co-rotatable relative to the armrest part, and in that the locking device comprises a wrap spring brake which interacts with the base axis section and the armrest axis section such that the armrest part is released during a swivel movement in the direction of the not-in-use position and locked during a reverse swivel movement in the direction of the armrest position. The wrap spring brake operates on the basis of increased or reduced frictional locking. Since the wrap spring brake is directly associated with the swivel axis, the result is a simple and space-saving structure. The mechanical effect of the wrap spring brake is functionally reliable. The division of the swivel axis into a base axis section and an armrest axis section also permits, in conjunction with the wrap spring brake, a particularly simple and inexpensive design of the locking device. The solution in accordance with the invention is suitable in a particularly advantageous manner for an armrest device inside a vehicle interior of a passenger car and arranged between the driving seat and the passenger seat. In the same way, the solution in accordance with the invention can also be provided for a swivellable central armrest in the region of a backrest of a rear bench seat. The armrest device can also be used in other vehicles such as trucks and commercial vehicles, in particular buses and coaches, or in railway carriages or in rows of seats for aircraft, in particular aeroplanes. The solution in accordance with the invention permits, thanks to the stepless operation of the wrap spring brake, a particularly low-noise movement of the armrest part between its end positions.

In an embodiment of the invention, the wrap spring brake has a helical wrap spring whose windings coaxially surround the armrest axis section and the base axis section, where said windings surrounding the base axis section are wrapped around the base axis section in a rotation direction which effects an opening of the windings during a swivel movement of the armrest part in the direction of the not-in-use position. The helical wrap spring is designed as a coil spring which is arranged coaxial to the axially adjoining armrest axis and base axis sections.

In a further embodiment of the invention, the windings of the wrap spring surrounding the armrest axis section surround a shell surface of the armrest axis section with greater frictional locking than the windings of the wrap spring surrounding a shell surface of the base axis section. This ensures that the windings of the wrap spring surrounding the armrest axis section always remain co-rotatably connected to the armrest axis section. A rotary movement of the armrest part and accordingly of the armrest axis section inevitably leads to a spreading open of the windings remaining stationary on the base axis section, so that a rotary sliding movement of these windings relative to the base axis section is possible.

In a further embodiment of the invention, the shell surfaces of the armrest axis section and of the base axis section align coaxially with one another. The shell surfaces of the armrest axis section and of the base axis section are designed preferably cylindrical. It is also possible to design the armrest axis section with polygonal cross-section and to provide the base axis section with a circular cross-section in order to achieve the required higher frictional locking than in the area of the base axis section when attaching the windings of the wrap spring in the region of the armrest axis section.

In a further embodiment of the invention, the windings of the wrap spring surrounding the shell surface of the armrest axis section are shrunk onto the shell surface. The required increased frictional locking of the wrap spring in the region of the armrest axis section is thus achieved in a simple and functionally reliable manner.

In a further embodiment of the invention, the wrap spring is manufactured from a spring wire with rectangular and preferably square cross-section. The rectangular cross-section ensures a wide contact area of the spring wire in the region of the shell surfaces of the armrest axis section and of the base axis section, and accordingly particularly good frictional locking. The rectangular cross-section of the spring wire is designed particularly advantageously as a square cross-section.

In a further embodiment of the invention, the locking device has a manually operated actuating element for releasing the wrap spring brake. This ensures that the armrest part can also be swivelled back in simple manner out of a not-in-use position or from another intermediate position above the armrest position and in the direction of the armrest position by one person, without having to exert excessively high forces.

In a further embodiment of the invention, the actuating element of a final winding is associated with the windings of the wrap spring surrounding the base axis section such that with appropriate manual actuation of the actuating element the final winding of the wrap spring is opened relative to the shell surface of the base axis section. The actuating element acts on the final winding such that it lifts the final winding off the shell surface of the base axis section, as a result of which, due to the stiffness of the windings of the wrap spring, the adjoining windings too of the wrap spring inevitably at least slightly loosen their wrapping around the base axis section such that the windings can slide in the circumferential direction on the shell surface of the base axis section. The spring stiffness of the wrap spring is designed such that there is necessarily an elastic transmission of this bending to the adjacent windings when the final winding is lifted off.

In a further embodiment of the invention, a mechanical control for actuation of the actuating element is arranged on the armrest part. The mechanical control can be designed as a pushbutton, setting lever, pulling loop or similarly designed control element.

In a further embodiment of the invention, the actuating element acts on a free front end area of the final winding of the wrap spring in the region of the base axis section. Advantageously, the actuating element is designed as a flexurally stiff tension and/or compression means that acts substantially tangentially on the front end area of the final winding relative to the shell surface of the base axis section. As a result, separation of the final winding from the shell surface of the base axis section and accordingly a release of the swivel movement of the armrest part in the direction of the armrest position is achieved by simple mechanical means.

BRIEF DESCRIPTION OF THE DRAWINGS

Further advantages and features of the invention are found in the claims and in the following description of a preferred design example of the invention shown in the drawings.

DETAILED DESCRIPTION

A vehicle interior of a passenger car has, in the region of a centre console 1 arranged between a driving seat and a passenger seat of the vehicle interior, an armrest device 2 described in detail in the following on the basis of FIGS. 1 to 6. The armrest device 2 comprises a base part 3 arranged stationary in the vehicle interior and permanently connected to the centre console 1 in the design example shown. An armrest part 4 is mounted swivellably movable on the base part 3. The armrest part 4 is designed as an elongated armrest element substantially extending in the vehicle longitudinal direction and resting in accordance with FIGS. 1 and 2 on a frame section of the base part 3 in its armrest position. The base part 3 can comprise, in the area of the frame section, a receptacle which is closed in the armrest position of the armrest part 4 by said armrest part 4.

Figure 3:
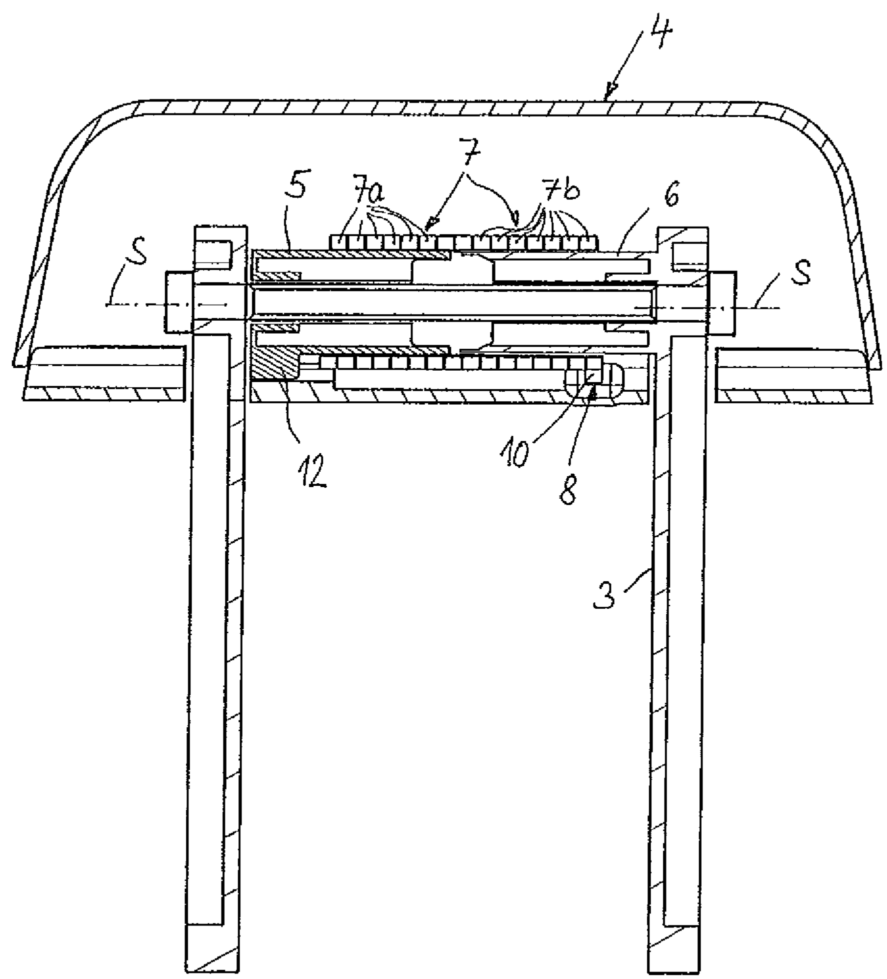
Figure 4:
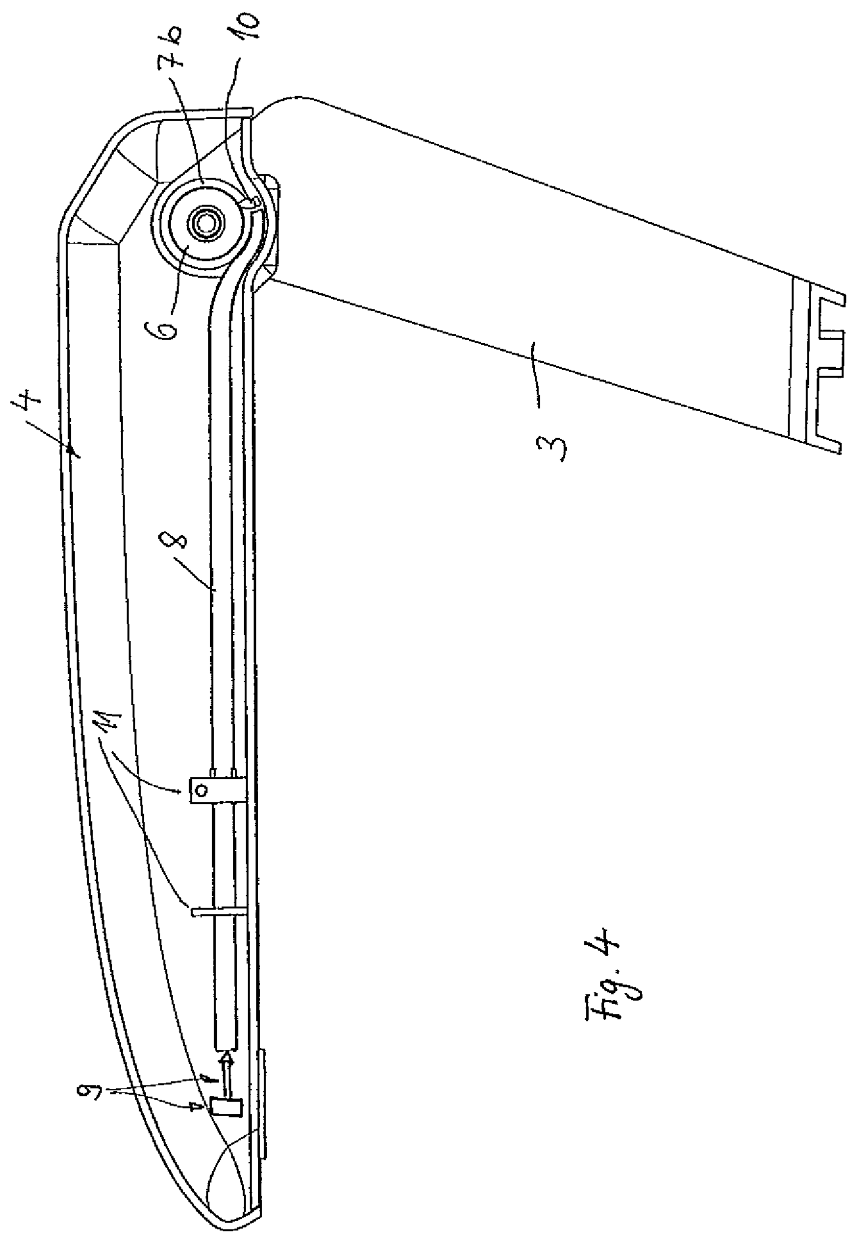
Figure 5:
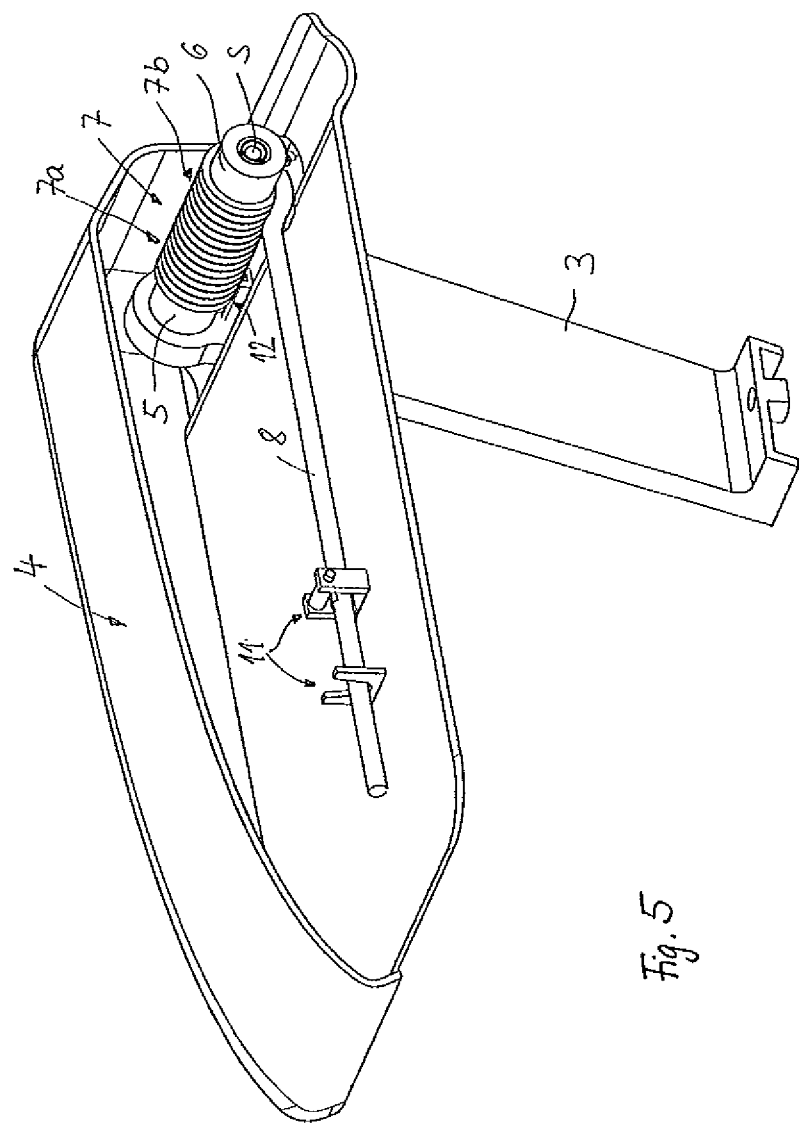
Figure 6:
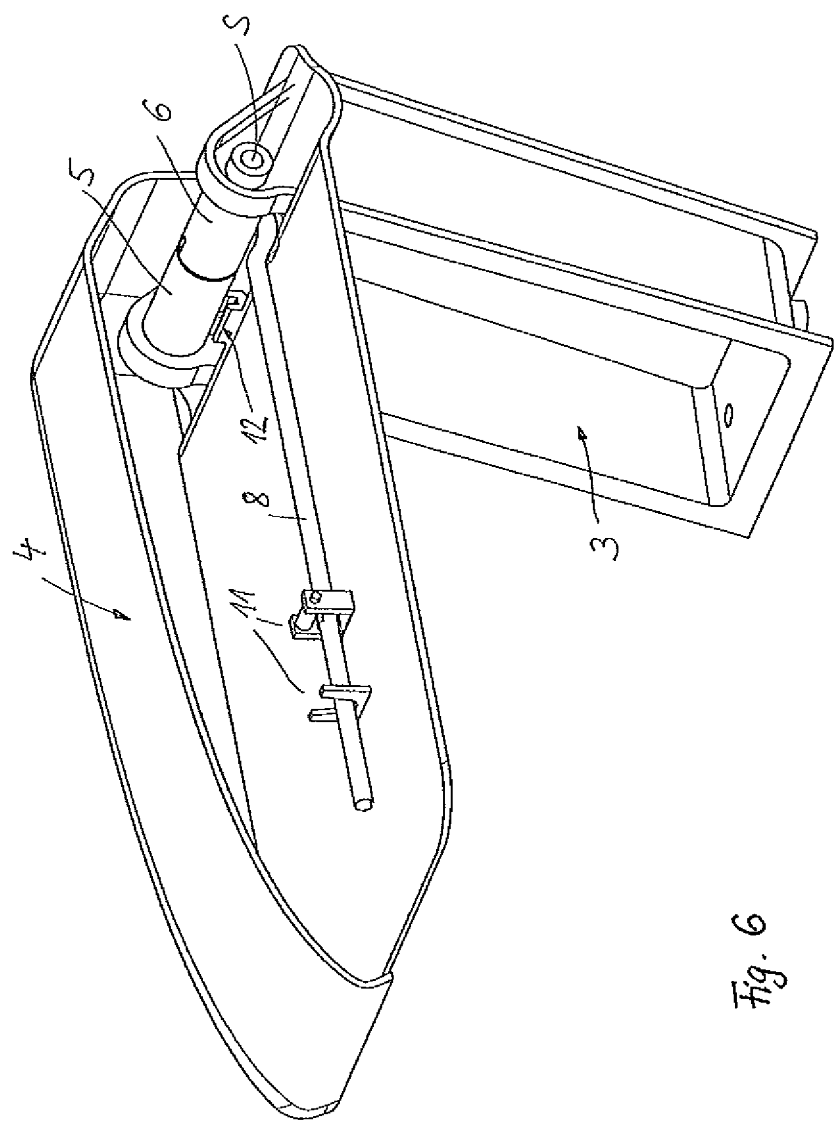

The armrest part 4 is at its rear end region on base part 3—seen in the normal driving direction of the car—mounted swivellably movable about a swivel axis S extending in the vehicle transverse direction. As can be discerned from FIGS. 3 to 6, the swivel axis S is formed by two axis sections aligned with one another and axially adjoining approximately in the centre of the swivel axis, of which one forms an armrest section 5 (on the left in FIG. 3) and the other a base axis section 6 (on the right in FIG. 3). The base axis section 6 is arranged stationary on the base part 3, forming in accordance with FIG. 3 a hollow-section projection protruding in one piece from a right-hand supporting leg of the base part 3 in the vehicle transverse direction towards the centre of the swivel axis S. A shell surface of the hollow-section projection forming the base axis section 6 is designed cylindrical. An axially adjoining and leftward-aligned left-hand half of the swivel axis S is formed by an armrest axis section 5 likewise designed as a hollow section and co-rotatably connected to the armrest part 4. The armrest axis section 5 also has a cylindrical shell surface aligned coaxially with the shell surface of the base axis section 6. At the front and towards the left, the armrest axis section 5 is limited by a left-hand supporting leg of the base part 3. The imaginary swivel axis S is physically formed by an inserted bolt connection passing through both the base axis section 6 and the armrest axis section 5. The armrest axis section 5 is supported coaxially by this physical swivel axis, as is shown in FIG. 3. The swivellably movable armrest part 4 is positively connected to the armrest axis section 5 via a driver arrangement 12, which can be discerned in FIGS. 3, 5 and 6. It can be discerned in particular from FIG. 6 that on the underside of the armrest axis section 5 a driver ridge is provided which engages in a driver groove extending in the vehicle transverse direction and provided in one piece on the armrest part 4. The armrest axis section 5 can, thanks to the swivel mounting and the driver arrangement 12, be swivelled together with the armrest part 4 relative to the base axis section 6 and hence relative to the base part 3 about the swivel axis S, where the armrest axis section 5 rotates with its shell surface coaxially to the shell surface of the base axis section 6 during a corresponding swivel movement.

Figure 1:
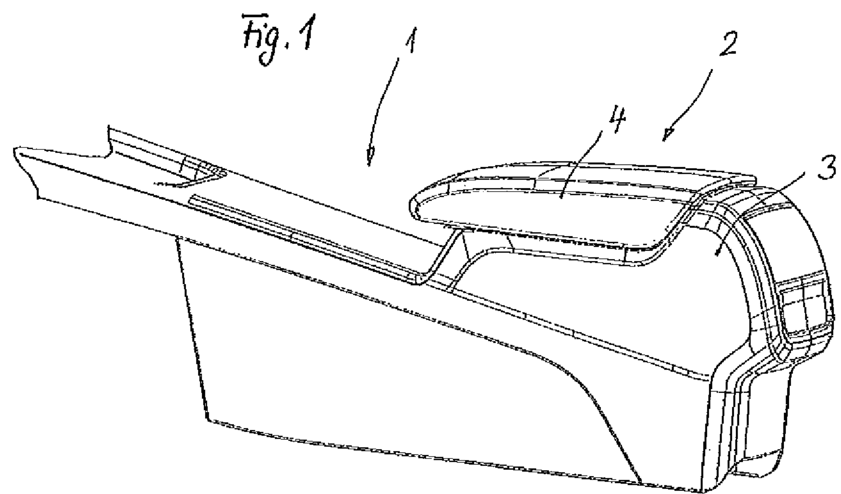
FIG. 1 shows in a perspective view a centre console of a vehicle interior of a passenger car with an embodiment of an armrest device in accordance with the invention, FIG. 2 the centre console according to FIG. 1 with an armrest part of the armrest device according to FIG. 1 swivelled upwards into an intermediate position, FIG. 3 in a schematic and enlarged cross-sectional view a swivel mounting of the armrest part relative to a base part of the armrest device according to FIGS. 1 and 2, where the selected sectional plane contains the swivel axis of the swivel mounting aligned in the vehicle transverse direction, FIG. 4 in a schematic longitudinal sectional view the armrest device according to FIG. 3, FIG. 5 in an isometric and partially cutaway view the armrest device according to FIGS. 3 and 4, and FIG. 6 the armrest device according to FIG. 5, omitting a wrap spring in the region of the swivel mounting of the armrest part.
Figure 2:
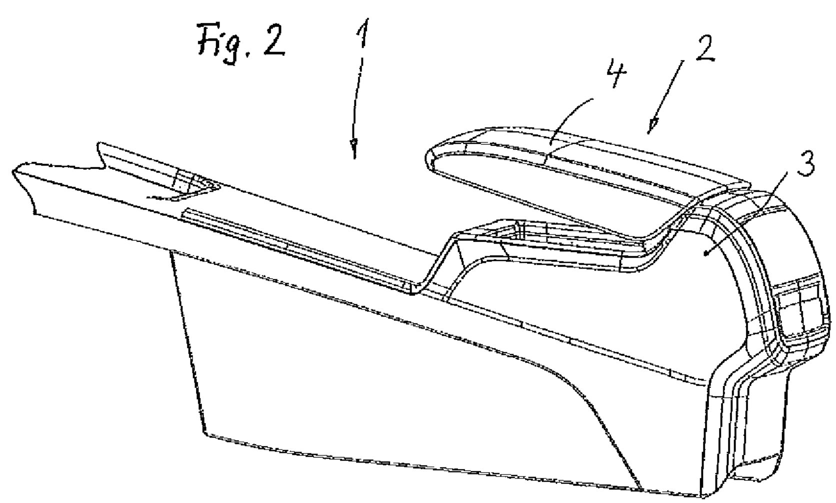

To allow the armrest part 4 to be secured in different swivel positions between the approximately horizontal armrest position in accordance with FIG. 1 and a not-in-use position swivelled upwards between backrests of the driving and passenger seats, a locking device described in detail in the following is provided.

The locking device comprises a wrap spring brake designed as a helical wrap spring 7. The wrap spring 7 comprises a plurality of windings, one half extending approximately over the shell surface of the armrest axis section 5 and the other half over the shell surface of the base axis section 6. The wrap spring 7 coaxially surrounds the shell surfaces of the armrest axis section 5 and of the base axis section and is accordingly also aligned coaxially to the swivel axis S. The wrap spring 7 is manufactured in one piece from a spring wire with square cross-section. The windings in FIG. 3 surrounding the shell surface of the armrest axis section 5 are provided with the reference 7*a*. The windings in FIG. 3 surrounding the shell surface of the base axis section are provided with the reference 7*b*. The windings 7*a* of the wrap spring 7 are shrunk onto the shell surface of the armrest axis section 5, said windings 7*a* being about a tenth of a millimeter (1/10 mm) smaller in diameter than the windings 7*b* contacting the shell surface of the base axis section 6. As a result, an increased frictional locking of the windings 7*a* is achieved in the region of the shell surface of the armrest axis section 5 compared with the windings 7*b* surrounding the shell surface of the base axis section 6. The windings 7*a* are accordingly permanently connected with frictional and positive locking to the armrest axis section 5.

The windings 7*a* and 7*b* of the wrap spring 7 are fitted onto the base axis section 6 in a rotation direction such that during a swivel movement of the armrest part 4 upwards out of the rest position, automatically also moving the windings 7*a* frictionally locked on the armrest axis section 5, the windings 7*b* are spread open. As a result, frictional locking is reduced relative to the shell surface of the base axis section 6 such that the windings 7*b* can slide on the shell surface of the fixed base axis section 6 in the circumferential direction. This is achieved by the spring stiffness of the wrap spring. The windings 7*a* have the effect of windings fitted rigidly onto the armrest axis section 5. The windings 7*b* contacting the base axis section 6 somewhat more loosely are spread open by the resultant torsion between the windings 7*a* and 7*b*. In the swivel direction of the armrest part 4 upwards out of the armrest position in the direction of the not-in-use position, the windings 7*b* rotate accordingly in the slightly opened state by sliding upwards in the swivel direction on the shell surface of the base axis section 6. In the case of a reverse swivel movement of the armrest part 4 in the direction of the lower armrest position, by contrast, the windings 7*b* are closed in a spring-elastic manner by the reversed rotations of the windings 7*a* positively connected to the armrest axis section, such that the windings 7*b* close more strongly around the shell surface of the base axis section 6. As a result, an increased frictional locking is achieved between the windings 7*b* and the shell surface of the fixed base axis section 6, thus locking the armrest part 4 against a downward swivel movement. Due to the wrapping of the windings 7*b*, the armrest part 4 is accordingly supported during a downward torque of the armrest part 4 about the swivel axis S.

In order to nevertheless again enable a downward swivel of the armrest part 4 in the direction of the armrest position, the frictional locking of the windings 7*b* relative to the shell surface of the base axis section 6 can be manually and mechanically reduced. To do so, an actuating element 8 is provided, which acts approximately tangentially on a front end area 10 of a final winding of the windings 7*b*. The front end area 10 of the final winding protrudes radially outwards to permit an improved mechanical action by the actuating element 8. The actuating element 8 is designed as a movable actuating rod for substantially linear movement, with its front end facing the final winding approximately tangentially contacting the shell surface of the base axis section 6 at the front end area 10 of the final winding of the windings 7*b*. The actuating rod 8 is actuated by a mechanical control 9 shown only schematically. The control 9 is preferably designed as a pushbutton arranged in the region of the outer contour of the armrest part 4 and manually operable. A manual actuation of the control 9 moves the actuating rod 8 in the direction of the swivel axis S, whereby a spreading effect away from the shell surface of the base axis section 6 is exerted on the front end area 10 of the final winding of the windings 7*b*, leading to a loosening of the frictional locking of further windings 7*b*. As a result, the armrest part 4 can be swivelled downwards, since the reduction of the frictional locking of the windings 7*b* relative to the shell surface of the base axis section 6 permits a rotation of the windings 7*b* relative to said shell surface in the downward swivel direction. The actuating rod 8 is guided in a linear movement by guide means 11, shown schematically, inside the armrest part 4.

The invention claimed is:

1. An armrest device for a vehicle interior comprising an armrest part movable between an armrest use position and a not-in-use position, a base part arranged fixed in the vehicle and on which the armrest part is mounted movable about a swivel axis, and a locking device for supporting the armrest part in at least one swivel position relative to the base part, wherein the swivel axis is axially split into a base axis section which is arranged stationary relative to the base part and into an armrest axis section which is arranged co-rotatable relative to the armrest part, wherein the locking device comprises a wrap spring brake which interacts with the base axis section and the armrest axis section such that the armrest part is released during a swivel movement in a direction of the not-in-use position and locked during a reverse swivel movement in a direction of the armrest use position, wherein the wrap spring brake comprises a helical wrap spring having windings coaxially surrounding the armrest axis section and the base axis section, where the windings surrounding the base axis section are wrapped around the base axis section in a rotation direction which causes an opening of the windings during a swivel movement of the armrest part in the direction of the not-in-use position.

2. The armrest device according to claim 1, wherein the windings of the wrap spring surrounding the armrest axis section surround a shell surface of the armrest axis section with greater frictional locking than the windings of the wrap spring surrounding a shell surface of the base axis section.

3. The armrest device according to claim 2, wherein the shell surfaces of the armrest axis section and of the base axis section align coaxially with one another.

4. The armrest device according to claim 2, wherein the windings of the wrap spring surrounding the shell surface of the armrest axis section are shrunk onto the shell surface.

5. The armrest device according to claim 2, wherein the locking device has a manually operated actuating element for releasing the wrap spring brake.

6. The armrest device according to claim 5, wherein the actuating element actuates a final winding of the windings of the wrap spring surrounding the base axis section such that with appropriate manual actuation of the actuating element the final winding of the wrap spring is opened relative to the shell surface of the base axis section.

7. The armrest device according to claim 6, wherein the actuating element acts on a free front end area of the final winding of the wrap spring in a region of the base axis section.

8. The armrest device according to claim 7, wherein the actuating element is designed as at least one of a flexurally stiff tension means and a flexurally stiff compression means that acts on the front end area of the final winding substantially tangentially relative to the shell surface of the base axis section.

9. The armrest device according to claim 5, wherein a mechanical control for actuation of the actuating element is arranged on the armrest part.

10. The armrest device according to claim 2, wherein the windings of the helical wrap spring that surround the shell surface of the armrest axis section are smaller in diameter than the windings of the helical wrap spring that surround the shell surface of the base axis section.

11. The armrest device according to claim 1, wherein the wrap spring is manufactured from a spring wire with a rectangular cross-section.

12. The armrest device according to claim 11, wherein the rectangular cross-section is a square cross-section.

13. The armrest device according to claim 1, wherein the armrest part only pivots about the swivel axis such that the armrest part has a single pivot point relative to the base part.

14. The armrest device according to claim 1, further including a pivot pin at the swivel axis with the armrest part pivoting about the pivot pin, and the swivel axis including a two-part cylindrical shell surrounding the pivot pin with a first cylindrical part of the two-part shell being fixed relative to the armrest part and a second cylindrical part of the two-part cylindrical shell being fixed relative to the base part, and wherein the windings surround both the first cylindrical part and the second cylindrical part of the two-part cylindrical shell.

15. The armrest device according to claim 1, wherein the windings surrounding the armrest axis section are fixed to the armrest axis section.

16. An armrest device for a vehicle interior comprising:

an armrest part swivellably movable between an armrest use position and a not-in-use position;

a base part arranged fixed in the vehicle and on which the armrest part is mounted movable about a swivel axis; and a locking device for supporting the armrest part in at least one pivot position relative to the base part;

the swivel axis comprises a tube axially split into a base axis section fixed to the base part and into an armrest axis section fixed to the armrest part; and the locking device comprising a wrap spring brake which surrounds and interacts with the base axis section and the armrest axis section such that the armrest part is released during a swivel movement in a direction of the not-in-use position and locked during a reverse swivel movement in a direction of the armrest use position.

17. The armrest device according to claim 16, wherein the armrest part only pivots about the swivel axis such that the armrest part has a single pivot point relative to the base part.

18. The armrest device according to claim 16, wherein the wrap spring brake comprises a helical wrap spring having windings coaxially surrounding the armrest axis section and the base axis section, where the windings surrounding the base axis section are wrapped around the base axis section in a rotation direction which causes an opening of the windings during a swivel movement of the armrest part in the direction of the not-in-use position.

19. The armrest device according to claim 18, wherein the windings of the wrap spring surrounding the armrest axis section surround a shell surface of the armrest axis section with greater frictional locking than the windings of the wrap spring surrounding a shell surface of the base axis section.

20. The armrest device according to claim 19, wherein the windings of the helical wrap spring that surround the shell surface of the armrest axis section are smaller in diameter than the windings of the helical wrap spring that surround the shell surface of the base axis section.

21. The armrest device according to claim 16, wherein the wrap spring brake comprises a helical wrap spring having windings coaxially surrounding the armrest axis section and the base axis section, wherein the windings surrounding the armrest axis section are fixed to the armrest axis section.

* * * * *